United States Patent [19]

Cicuttini

[11] 4,412,867

[45] Nov. 1, 1983

[54] WET MILLING OF STARCH BEARING MATERIALS WITH WATER RECYCLE AFTER REVERSE OSMOSIS OR ULTRAFILTRATION

[75] Inventor: Amelio Cicuttini, Sterrebeek, Belgium

[73] Assignee: CPC International Inc., Englewood Cliffs, N.J.

[21] Appl. No.: 405,491

[22] Filed: Aug. 5, 1982

Related U.S. Application Data

[63] Continuation of Ser. No. 245,558, Mar. 19, 1981, abandoned.

[30] Foreign Application Priority Data

Mar. 26, 1980 [GB] United Kingdom ............... 8010226
Jan. 20, 1981 [GB] United Kingdom ............... 8101643

[51] Int. Cl.³ ........................... C13L 1/00; C13L 1/02
[52] U.S. Cl. ........................................ 127/66; 127/67; 127/68; 127/69
[58] Field of Search .................... 127/24, 66, 67, 68

[56] References Cited

U.S. PATENT DOCUMENTS

| 2,987,424 | 6/1961 | Olnick | 127/68 X |
| 3,251,717 | 5/1966 | Honeychurch | 127/68 |
| 4,144,087 | 3/1979 | Chwalek | 127/24 |
| 4,171,383 | 10/1979 | Chwalek | 127/68 X |
| 4,207,118 | 6/1980 | Bonnyay | 127/24 |
| 4,255,518 | 3/1981 | Muller | 127/68 X |

FOREIGN PATENT DOCUMENTS

| 455158 | 10/1936 | United Kingdom . |
| 502791 | 3/1939 | United Kingdom . |
| 502954 | 3/1939 | United Kingdom . |
| 502955 | 3/1939 | United Kingdom . |
| 502956 | 3/1939 | United Kingdom . |
| 516960 | 12/1939 | United Kingdom . |

OTHER PUBLICATIONS

The Commonwealth and International Library, "Chemical Industry", J. Davidson Pratt et al., eds., The Starch Industry by J. W. Knight, Chapt. 4 entitled Manufacture of Starches, pp. 32–45, Pergamon Press, London and New York.
L Bonnyay, Starch/Starke, 30(2), S.61–64, (1978).
Chemical Abstracts, 85:19776p (1976).
Chemical Abstracts, 92:10866a (1980).
Chemical Abstracts, 92:168663s (1980).

Primary Examiner—Sidney Marantz

[57] ABSTRACT

Wet milling of starch bearing materials (e.g. corn, potatoes or wheat) wherein water being used in the process is separated by reverse osmosis or ultrafiltration, into two fractions, one fraction (the first fraction) having a lower content of soluble and insoluble matter than the other (second) fraction. The first fraction is then recycled to the washing step of the milling process where it is used to wash the starch. The separation and recycling steps reduce the water requirement of the milling process and also reduce the volume of effluent leaving the process, which needs to be evaporated and/or disposed of.

14 Claims, 7 Drawing Figures

WET MILLING OF STARCH BEARING MATERIALS WITH WATER RECYCLE AFTER REVERSE OSMOSIS OR ULTRAFILTRATION

This application is a continuation of application Ser. No. 245,558, filed Mar. 19, 1981, abandoned.

BACKGROUND OF THE INVENTION

1. Field of the Invention

This invention relates to the wet milling of starch bearing materials. The invention will be described with reference to the wet milling of corn, but it will be understood that it can also be applied in other wet milling processes, e.g. those applied to fractions of corn and to wheat, potatoes, etc., for the recovery of starch and/or protein therefrom.

2. The Prior Art

The conventional method of wet milling corn is divided into four steps:

(i) The corn is steeped in water under conditions to soften the grains and the resulting light steep water is separated from the softened grains. Typically, from 0.3 $m^3$ to more than 1 $m^3$ of light steep water is produced per ton of corn ground.

(ii) The softened grains are wet milled and the separated by-products, germ, fibres (hull) and gluten are recovered, typically as set masses at an average solids content of 30-50% by weight.

(iii) The starch slurry resulting from wet milling is washed, usually in several stages by means of a countercurrent flow of water, to reduce the levels of soluble and insoluble impurities down to desired amounts. For this washing process, from 1.0 $m^3$ to 2.0 $m^3$ or more of water is used per ton of corn ground.

(iv) The resulting starch slurry may, optionally, depending on its intended use, be dewatered in which case the water is recycled to the washing step (iii).

Conventionally, water for the process passes countercurrent to the starch. Fresh water enters the process at the last washing stage of step (iii) and passes successivley through the washing stages back to the first. Water that has been used in step (iii) passes to the wet milling step (ii). Water from the wet milling step (ii) passes to the steeping step (i) and finally leaves the system as light steep water. The solids content of the water rises on passage through each of these steps, and reaches a level from about 60 to 110 g/l in the light steep water. Most or all of the light steep water is treated, usually by evaporation, to recover the solids which are valuable for various uses, e.g. in animal feedstuffs.

One of the factors which determines the purity of the starch product is the amount of water used in the washing step (iii). For a given purity it is possible to compensate to some extent for a reduction in the amunt of washing water by increasing the number of washing stages. However, even with such refinements, it is not possible to obtain high purity starch without washing it with a lot of water—more water than is required for the earlier steeping and milling steps of the process.

Alternative methods for the recovery of starch and other products from corn or other starch bearing materials have been proposed. For example, U.S. Pat. Nos. 4,171,384 and 4,181,748 to Chwalek and Olson disclose dry-wet milling processes for wheat and corn, respectively, wherein the raw materials are first dry milled and the major portion of fibre and germ are removed after which the remaining portion of the kernel is wet processed. Such systems employ less water than wet milling and therefore make washing of the starch more critical.

Every additional kilogram of fresh water that is introduced into the washing step becomes an additional kilogram of light steep water that has to be evaporated or otherwise treated. It is an object of this invention to provide a process that enables a larger volume of water to be used in the washing step without a concomitant increase in the volume of the light steep water; or conversely, which reduces the amount of light steep water without a concomitant reduction in the amount of water for washing the starch.

Conventional wet processes applied to materials other than whole grains, e.g. potatoes or wheat flour, do not employ steeping steps as such, but all employ final starch washing steps as well as preliminary treatments with water, eg., soaking, slurrying, or conditioning with water.

SUMMARY OF THE INVENTION

The present invention provides a process for recovering a starch slurry from a starch bearing material comprising the steps of:

(i) forming an aqueous slurry of the comminuted starch bearing material, (ii) separating a starch rich fraction from the greatest part of the remaining components of the slurry, and (iii) washing the starch rich fraction in at least one stage and recovering a product starch slurry of desired purity.

Fresh water for the process is introduced at step (iii). Water for step (i) and step (ii) is taken from that used in step (iii). At least part of the water that is being used in the process, but has not yet exited therefrom, is separated into first and second fractions of which the first fraction has a lower content of both soluble matter and insoluble matter than the second fraction. The first fraction is recycled and used together with the fresh water to increase the purity of the starch in the washing step (iii).

When the starch bearing material is corn, the first two steps of the above method together typically involve (i) steeping and (ii) wet milling. When the starch bearing material is wheat, the first two steps together typically involve grinding, slurrying and separation of the gluten. When the starch bearing material is potato, the first two steps together typically involve grinding and separation of the fruit water and fibre.

DETAILED DESCRIPTION OF THE INVENTION

The following detailed description is directed mainly to the treatment of corn.

The separation which characterizes this invention may be performed on the water leaving the washing step (iii) and passing to step (ii), i.e., the wet milling step when the treatment is applied in corn. Alternatively, it may be performed on the water between steps (i) and (ii); or on water between the two stages of the washing step (iii) when a multi-stage washing step is used.

The separation is into a first fraction of low solids content which is recycled to step (iii), or preferably to the last stage thereof when a multi-stage washing step is used; and a second fraction of higher solids content which is passed to an earlier step, e.g., the next upstream step, of the process, that is to say to the wet milling step (ii) when the separation is performed on water that has been used for the washing step (iii).

In one particularly preferred embodiment of the invention, the characteristic separation step may be performed on the water carrying the gluten in suspension which has left the station of primary separation of gluten from starch. As more fully described hereinafter, performing the separation at this point enables the operator to effect primary separation of gluten from starch and washing of the starch at much higher dilution, and in consequence more efficiently than has previously been economically possible.

The separation must concentrate both soluble and insoluble matter into one fraction, and conventional filtering and centrifuging are therefore not by themselves suitable. It may be possible to effect desired separation by ultrafiltration or by a two stage process such as centrifuging and using activated adsorbents. However, the preferred separation technique according to this invention is reverse osmosis. Using reverse osmosis, we have readily been able to separate water from starch washing, which contains soluble protein equivalent to 1000 ppm or more of nitrogen, into two fractions. The first fraction contains soluble protein equivalent to less than 10 ppm of nitrogen and is suitable for recycling to the final stage of washing the starch.

The technique of reverse osmosis involves bringing the solution to be purified into contact, through a semipermeable membrane, with pure solvent (e.g., water) there being a pressure difference across the membrane greater than the osmotic pressure of the solution to be purified. Pressure differentials of about 20 to 100 atmospheres may generally be used. Since the solution to be purified in this case contains insoluble as well as soluble matter, it is advisable to maintain a flow across the semi-permeable membrane to delay or prevent blocking of the pores. A suitable arrangement involves maintaining a continuous cyclic flow of liquid through a tube of semi-permeable membrane material, and adding the solution to be purified, i.e., separated into fractions, to the circulating liquid. The first fraction is recovered through the semi-permeable membrane, and the second fraction is recovered by bleeding it off from the circulating liquid. Techniques of reverse osmosis, performed on liquids containing insoluble as well as soluble matter, are known in the art and will not be further described here.

The desired purity of the starch slurry depends on its intended end use. Typical specifications call for a nitrogen content (as a measure of soluble protein) in the range of less than about 10 to 1000 parts per million dry basis. The first fraction of water separated by e.g. reverse osmosis should have a nitrogen content not greatly in excess of this nitrogen content so that when such water is used for washing the starch it will improve, rather than spoil, the purity thereof.

BRIEF DESCRIPTION OF THE DRAWINGS

Reference is made to the accompanying drawings, in which:

FIG. 1 is a water balance diagram of a conventional process, expressed in tons per day on a throughput of 1000 tons of corn per day;

FIG. 2 is a water balance diagram on a comparable basis for a process according to this invention;

FIG. 3 is a water balance diagram of another process according to the present invention, expressed in tons per day on a throughput of 1000 tons of corn per day;

FIG. 4 is a diagram showing in more detail the material balances during the primary separation and washing stages of a system similar to that of FIG. 3.

FIG. 5 is a material balance diagram of a conventional process, expressed in tons per day on a throughput of 1000 tons of potatoes per day, and FIG. 6 is a material balance diagram on a comparable basis for a process according to the present invention.

Referring now to FIG. 1, the three steps of the conventional process, namely, steeping, milling and washing, are shown as separate boxes. Water is introduced into the system at two points; 150 tons per day to the steeping step (i) as moisture normally present in the corn; and 1572 tons per day of fresh water to the last stage of the washing step (iii). This water leaves the system as follows; 841 tons per day in the starch slurry; 317 tons per day associated with the germ, fibres and gluten that are separated from the starch and from one another in the milling step (ii); and 564 tons per day in the light steep water. If the amounts of water removed with the starch, gluten, fibres and germ are kept constant, then an increase in the amount of fresh washing water results in an increase in the amount of light steep water produced.

Referring now to FIG. 2, the process of this invention is distinguished from the conventional process of FIG. 1 in that the water passing from the washing step (iii) to the milling step (ii) is divided into two streams, one of which is separated by reverse osmosis into first and second fractions, each amounting to 284 tons per day. The first fraction is recycled and mixed with the supply of fresh water for introduction into the last stage of the washing step (iii). The second fraction is passed with the remainder of the water from step (iii) to the milling step (ii).

Figure 1:
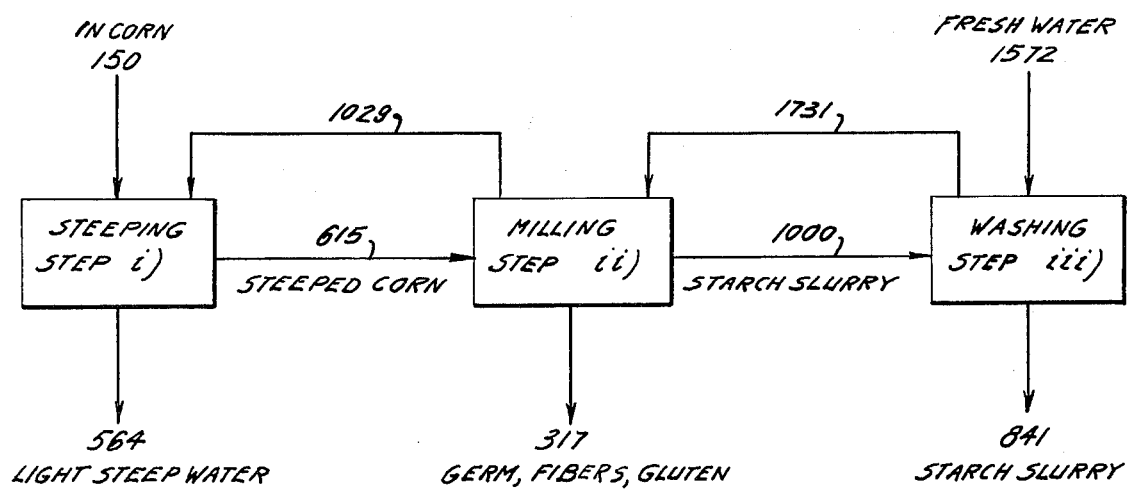
FIGS. 1 to 4 relate to corn.

By this means, although the total amount of washing water used in step (iii) remains the same at 1572 tons per day, the amount of fresh water supplied is reduced, in comparison to the conventional process, by 284 tons per day, to 1288 tons per day. In the same way, the amount of water removed from the system as light steep water is reduced, from 564 tons per day in the conventional process of FIG. 1, to 280 tons per day.

Figure 2:
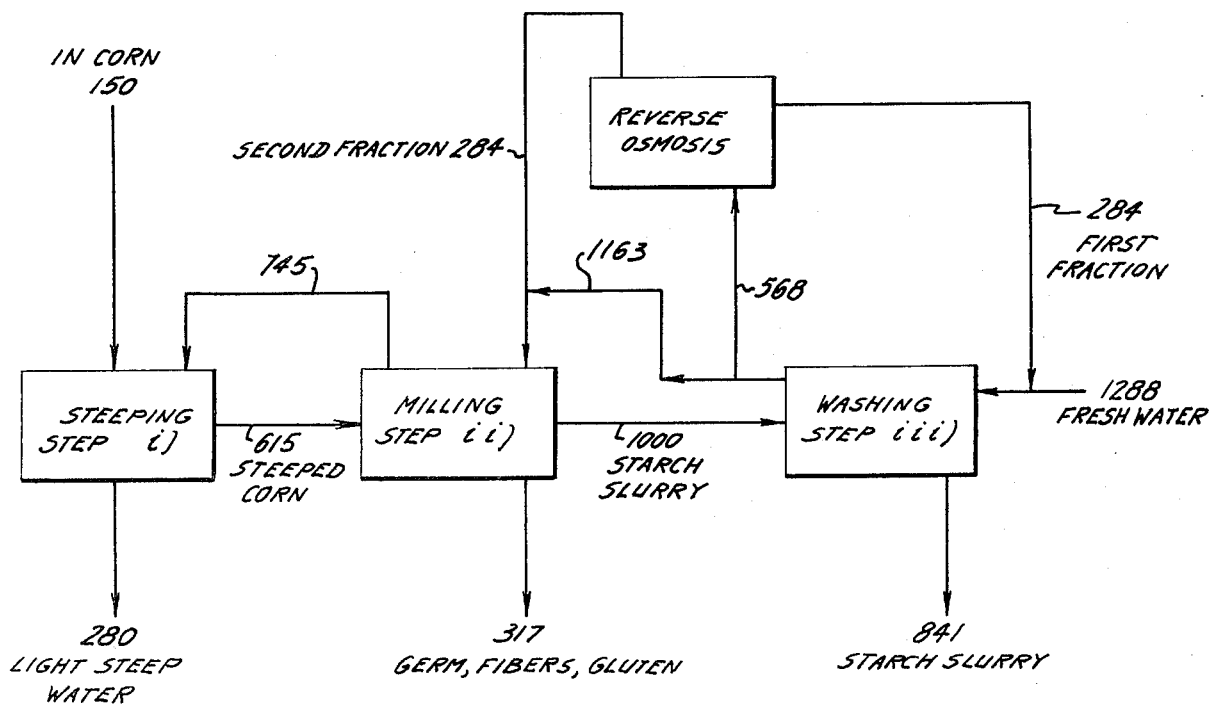

In the process of this invention shown in FIG. 2, a small proportion of the soluble material is removed from the light steep water and a large proportion is removed from the germ, fibre and gluten fractions. If more water had been through the separation step (FIG. 2) and recycled, this change in the location of the soluble material would have been more significant. It may be desired for various reasons to recover a substantial proportion of the soluble material from the light steep water, rather than with the germ, fibres and gluten fractions. This consideration may determine the proportion of the flow of water from the washing step (iii) to the milling step (ii) that should be subjected to reverse osmosis.

The separation step of FIG. 2 is shown as dividing 568 tons per day of water into first and second fractions of equal weight. The weights of the two fractions, however, can be different. The proportions of the two fractions are best determined by one skilled in the art according to the reverse osmosis technique used.

The separation is shown as being performed on water passing between washing step (iii) and the milling step (ii). The separating step could be performed, however, on water between two stages of a multi-stage washing step (iii); or water passing from the milling step (ii) to the steeping step (i); or on any stream within step (i) or step (ii).

As has been pointed out, the process of this invention enables one to reduce the quantity of light steep water without reducing the quality of the starch product. It does this with the extra operation of separating of water into two fractions. Nevertheless the energy savings resulting from the process can be very considerable. A conventional efficient evaporation process for light steep water may require 240 kWh per ton of water evaporated. By contrast, the energy required to separate 2 m$^3$ of wash water by reverse osmosis into two fractions of 1 m$^3$ each is typically 8 kWh.

Figure 3:
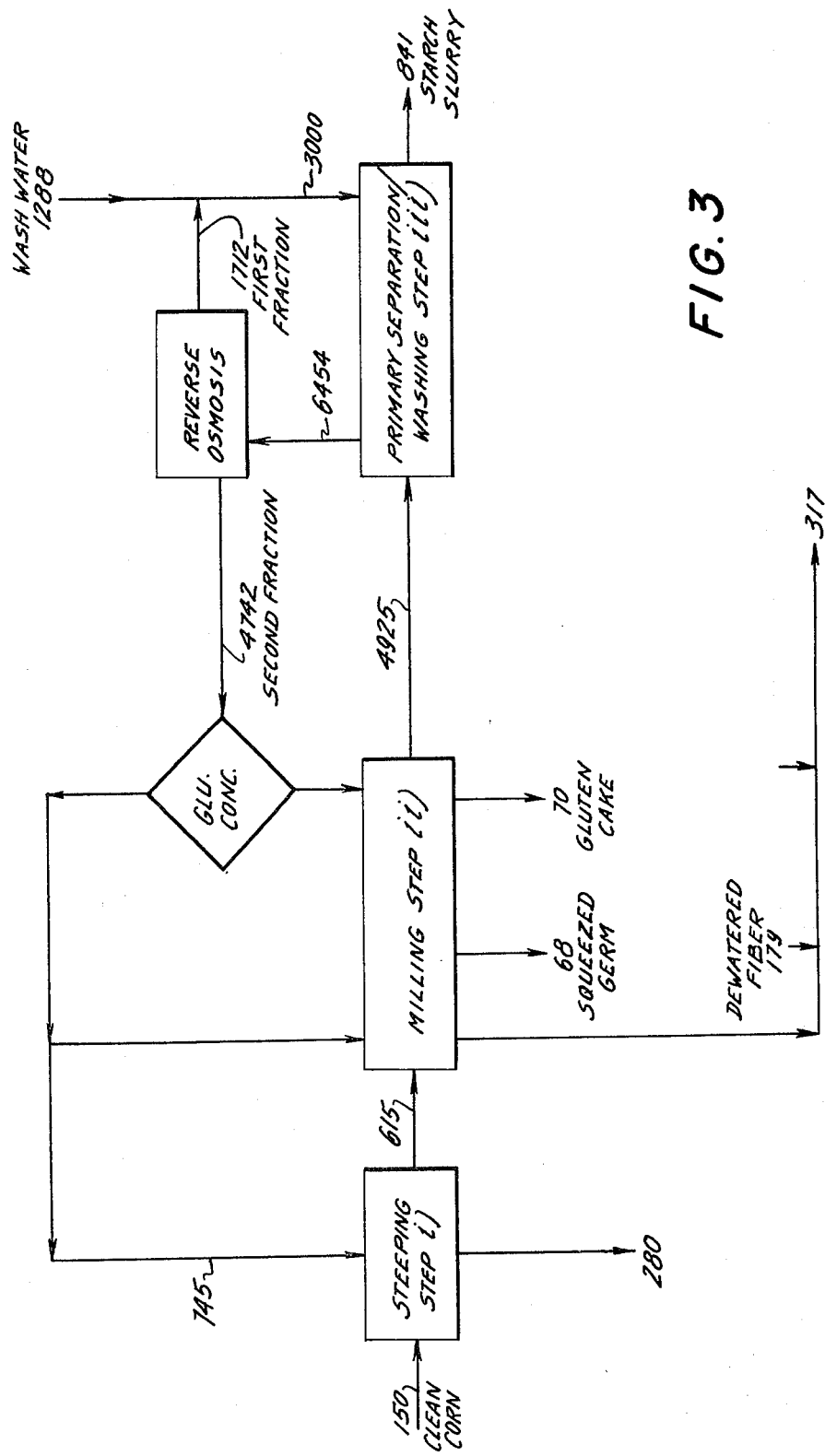

Referring now to FIG. 3, the three steps of the conventional process, namely steeping, milling and washing are shown as separate boxes. However this diagram differs from FIGS. 1 and 2 in that the primary separation of gluten from starch is shown in the "Primary Separation/Washing" box rather than in the "Milling" box.

Water enters the system at two points; 150 tons per day to the steeping step (i) as moisture normally present in the corn: and 1288 tons per day of fresh water to the last stage of the washing step (iii). This water leaves the system as follows; 841 tons per day in the product starch slurry; 317 tons per day associated with the germ (68 tons), fibre (179 tons) and gluten (70 tons); and 280 tons per day in the light steep water.

The quantities in the preceding paragraph are the same as those in the system of FIG. 2. The difference between the two systems is the amount of water that is recycled from the reverse osmosis to the washing step (iii).

In FIG. 3, 1712 tons per day of permeate is recycled, giving a total input of washing water of 3000 tons per day. As a result, the primary separation and washing step (iii) are performed at high dilution.

Figure 4:
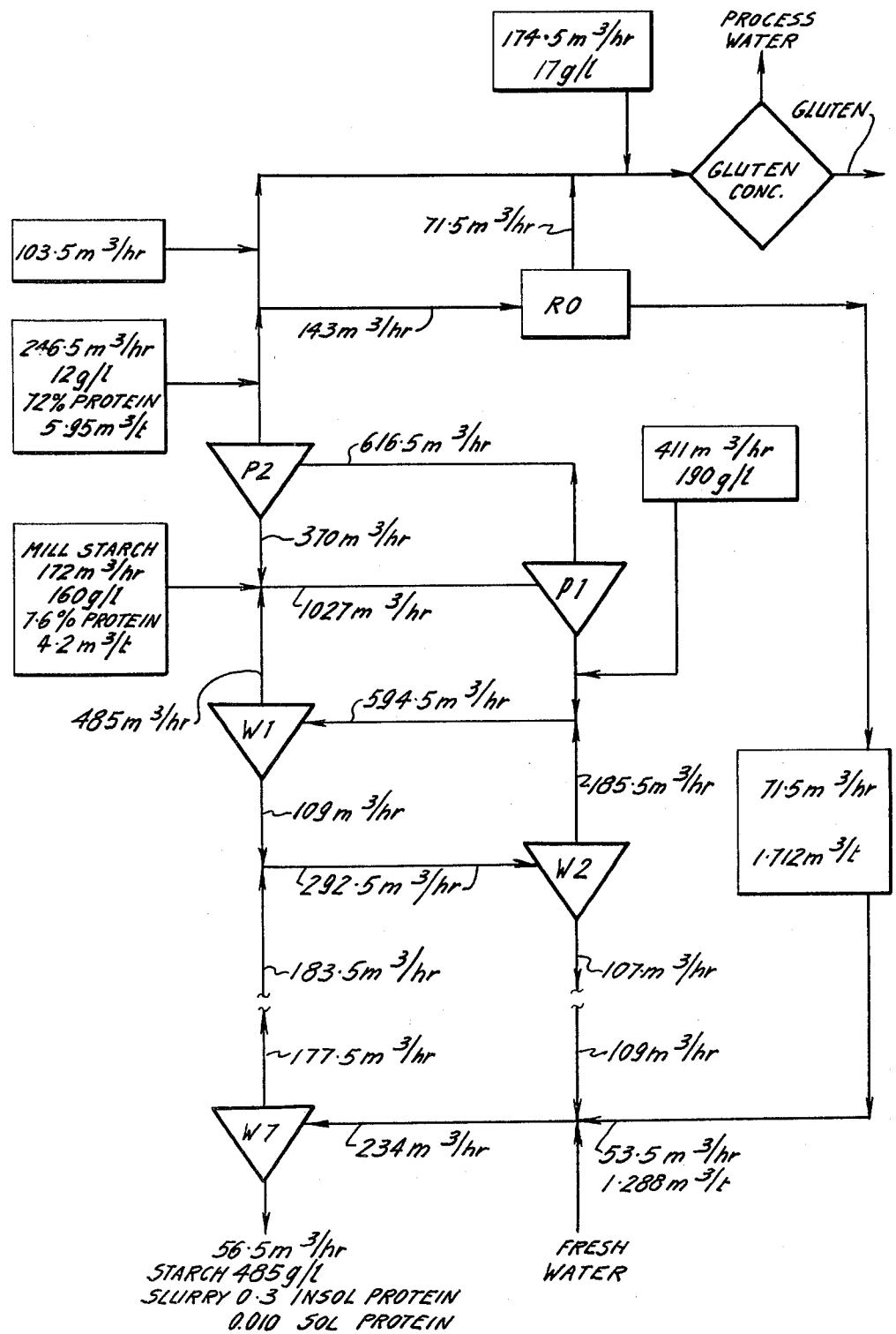

FIG. 4 is a materials balance diagram of the primary separation and starch washing stages of a system such as that shown in FIG. 3. The system comprises two primary separation stages $P_1$ and $P_2$, each consisting of a bank of hydroclones, which together effect separation of an overflow slurry of gluten and an underflow slurry of starch; and seven starch washing stages $W_1$ to $W_7$, of which only $W_1$, $W_2$ and $W_7$ are shown for simplicity, each also consisting of a bank of hydroclones.

Mill starch enters the system at a rate of 172 m$^3$/hr at a concentration of 8°Be (160 g/l) containing 7.6% by weight protein with 4.2 m$^3$ of water per ton of corn, and passes to the first and second primary separation stages $P_1$ and $P_2$. Starch is recovered as the underflow from the first primary separation stage $P_1$ as 411 m$^3$/hr of a slurry at a concentration of 190 g/l (about 10°Be) with 9.8 m$^3$ of water per ton of corn, (the ratio underflow/supply at stage $P_1$ is 0.40), and is passed to the first washing stage $W_1$. The underflow from each washing stage $W_n$ passes to the next higher washing stage $W_{n+1}$. The overflow from each washing stage $W_n$ passes to the next lower washing stage $W_{n-1}$. The starch product is recovered as the underflow of washing stage 7 at 56.5 m$^3$/hr of a slurry at a concentration of 485 g/l (23°Be) containing 0.3% insoluble protein and 0.010% soluble protein.

Gluten is recovered as the overflow from the second primary separation stage $P_2$ at 246.5 m$^3$/hr of a slurry containing 12 g/l of insoluble matter of which 72% is protein, and 5.95 m$^3$ of water per ton of corn, 143 t/hr of this stream is passed to a reverse osmosis stage RO, where it is separated into first and second fractions of equal volume. The first fraction, of relatively low solubles and insolubles content, is recycled to the starch washing stage $W_7$. The second fraction, of relatively high solubles and insolubles content, is combined with the rest of the gluten slurry and passed to a gluten concentrator.

Fresh water enters the system at a rate of 53.5 m$^3$/hr (eqiuvalent to 1.288 m$^3$ per ton of corn ground). It is mixed with 71.5 m$^3$/hr of water being the first fraction from the reverse osmosis stage, and the combined stream is mixed with the starch at washing stage $W_7$.

The first fraction from the reverse osmosis stage is shown as entering the final washing stage $W_7$. However, it might alternatively have been directed so as to enter an intermediate washing stage, such as $W_6$ or $W_5$. This may indeed be preferable if the nitrogen content of the first fraction is somewhat higher than the desired nitrogen content of the final starch slurry. The reverse osmosis step may be designed to produce a first fraction (permeate) of purity appropriate for introduction to a desired stage of washing the starch.

The volume of each overflow and underflow, and the direction in which these are made to flow, are indicated in the diagram.

The embodiment of the invention described with reference to FIGS. 3 and 4 has a number of advantages over the conventional wet starch milling operation.

This embodiment permits the use of hydroclones, rather than centrifuges, for the primary separation and washing stages. This permits a reduction in capital expenditure, since hydroclones are cheaper than centrifuges.

The use of hydroclones for primary separation and starch washing is known. U.S. Pat. No. 4,144,087 relates to a method of separating mill starch into a starchrich stream and protein-rich stream, and is characterized by the use of a special series of stages under controlled conditions involving at least two portein-separation stages and a plurality of starch washing stages. Hydroclones are used rather than the more expensive centrifuges. It is noted in the patent that the process enables the operator to obtain at the same time gluten of acceptable protein content and starch of acceptable purity.

The present invention permits the operator to achieve these advantages, gluten of acceptable protein content together with starch of acceptable purity, in a more flexible manner and using a wider range of operating conditions than was previously possible.

Direct comparison of the energy costs of operating the present invention and the conventional wet milling process are difficult because of the many different kinds of operations involved. However, even without taking into account the reduced volume of light steep water to be evaporated, the energy costs of operating the present invention are about equal to or less than the energy costs of conventional wet milling for equivalent product purity.

Another advantage of the present invention relates to gluten. Gluten can be used for animal feed, but at a purity greater than about 70% it can be used for industrial or food applications and so commands a premium price. Conventional wet milling typically produces gluten at a purity of 68-70%.

The quality of the starch product depends to a large extent on its soluble and insoluble protein content. Depending on its intended use, the starch may typically be required to contain less than 0.4% insoluble protein and less than 0.02% soluble protein.

It is know that if a given system is modified to improve the purity of the gluten, a side effect is to increase the insoluble protein content of the starch. The system illustrated in FIG. 4 is remarkable in achieving at the same time, both a high gluten purity of 72% and a starch having low concentration of soluble and insoluble protein (0.01% and 0.3% respectively.)

It is also known that, at equal underflow density, the lower the density of the supply to the hydroclones, the higher is the proportion of insoluble protein that goes to the overflow in each stage. In systems of the kind illustrated in FIGS. 3 and 4, the density of the supply to the first primary separation stage $P_1$ would typically be less than 8°Be, while a typical density in conventional operation using a mill starch thickener at that stage would be at least 8°Be. Similarly, in systems of the kind illustrated in FIGS. 3 and 4, the density of the supply to the first washing stage $W_1$ would typically be less than the typical density in a conventional washing operation.

It is known that the higher the amount of wash water to the last washing stage, the higher is the reduction of solubles in the underflow starch in each stage and therefore in the final stage. In systems of the kind illustrated in FIGS. 3 and 4, the amount of wash water introduced at the last washing stage would typically be greater than the amount of wash water used in conventional wet milling.

It is known that the higher the overflow/supply volume ratio of a hydroclone, the greater is the proportion of solubles that goes with the overflow at each hydroclone stage. In systems of the kind illustrated in FIGS. 3 and 4, the overflow/supply volume ratios of the various hydroclones are typically greater than those used in conventional operation.

In conventional corn wet milling, the amount of washing water used is kept to a minimum, in order to minimize the volume of light steep water that has to be evaporated. In order to adequately wash the starch without using much water, it has been necessary to increase the number of washing stages above 10 to 13 or even 15. This is expensive, both in terms of equipment and space. By using a large amount of washing water, systems of the present invention achieves a high standard of purity with as little as 7 washing steps, or even less, depending on the desired protein content of the gluten.

In conventional corn wet milling, it is usual to position a mill starch concentrator upstream of the primary starch/gluten separation station with the purpose of reducing the solubles load to the starch washing process, and thereby minimize the number of starch washing stages needed. It is is also usual to position a middlings concentrator to treat water passing from the first starch washing stage to the primary starch/gluten separation station, in order to enhance the efficiency of the latter.

A disadvantage of mill starch concentrators and middlings concentrators is that they require separate controls. Systems according to the present invention do not require mill starch concentrators or middlings concentrators, and are accordingly cheaper to install and easier to control and operate.

The efficiency of gluten recovery is inversely dependent on the density of the supply to the primary starch/gluten separators. In conventional operation, it is possible to reduce the density of the supply, and so increase the efficiency of gluten recovery, but with the disadvantage that a larger gluten concentrator is required. Systems according to the present invention where a reverse osmosis station is positioned upstream of the gluten concentrator, achieve the advantage of efficient gluten recovery without the disadvantage of needing a large gluten concentrator.

As previously mentioned, one effect of the reverse osmosis and recycling which characterizes this invention is that the volume of light steep water is reduced. In consequence a smaller proportion of the soluble material is removed in the light steep water, leaving a larger proportion to be removed with the germ, fibre and gluten or to contaminate the starch. In the system shown in FIG. 2, this risk of contamination of the starch may set a limit on the reduction of the volume of light steep water.

By contrast, the systems shown in FIGS. 3 and 4 ensure that the starch is well washed, and remove the risk of contamination. Hence is such systems it is possible, and may well be advantageous, to recycle less water to the steeping stage, and so to reduce the volume of light steep water drawn off to zero.

The first fraction of water recycled from the reverse osmosis station to the starch washing stages may be thought of as performing three functions:

(a) reducing the amount of light steep water, (b) reducing the density of supply to the hydroclones, and hence improving the efficiency of separation of starch from insoluble protein, and (c) increasing the total volume of wash water, and hence improving the efficiency of separation of starch from soluble material.

Systems of the present invention are very flexible, for the operator can, by adjusting flow rates, enhance or diminish any one of the above functions in relation to the others.

Figure 5:
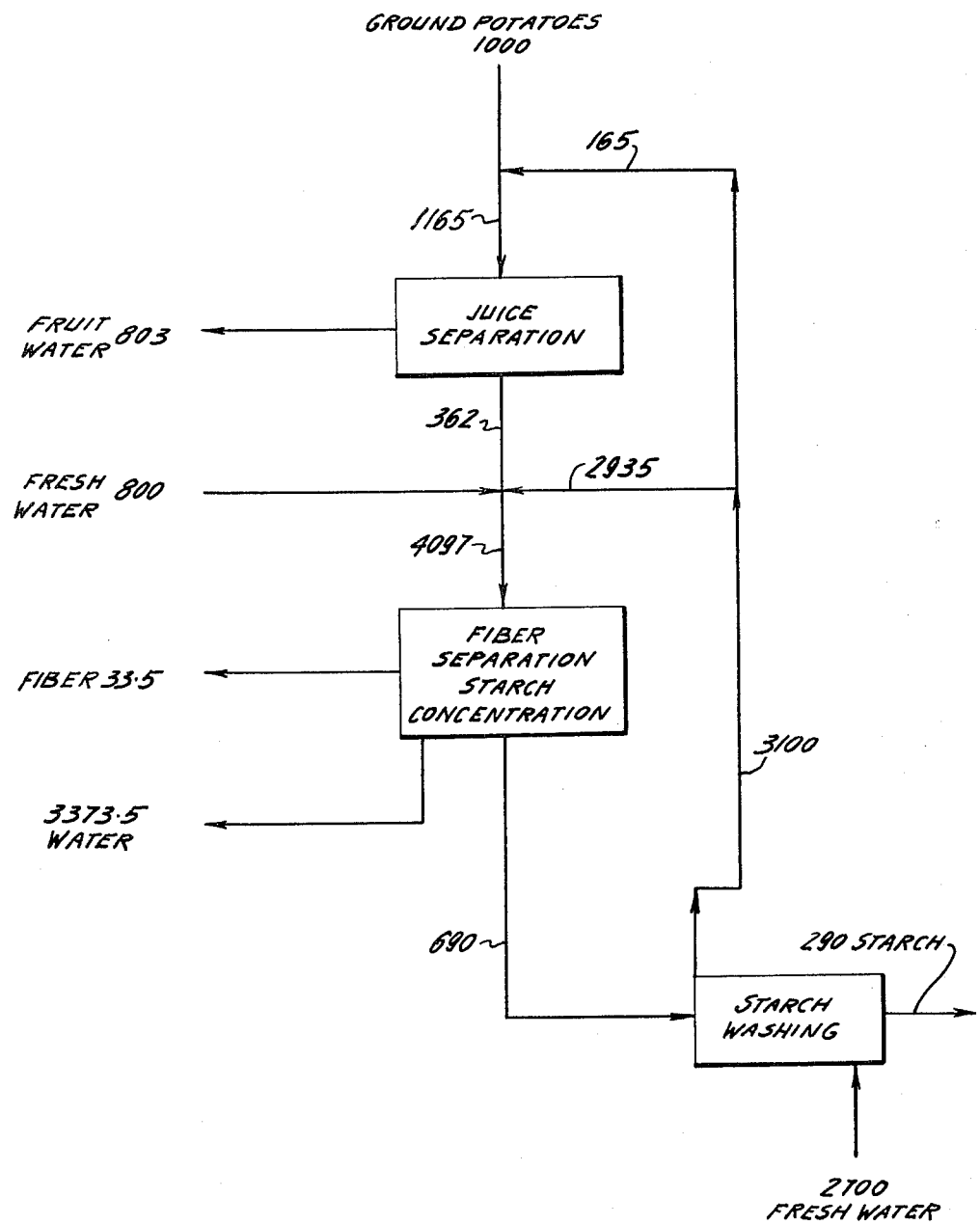
FIGS. 5 and 6 relate to potatoes.

Referring now to FIG. 5, the steps of the conventional process for recovering starch from potatoes, namely juice separation, fibre separation/starch concentration, and starch washing, are shown as separate boxes. 1000 tons per day of ground potatoes enter the system at the juice separation step. Fresh water is introduced at two points, 800 tons per day at the fibre separation/starch concentration step, and 2700 tons per day at the last stage of the starch washing step. These materials leave the system as follows: 803 tons per day of fruit water; 33.5 tons per day with fibre; 3373.5 tons per day waste water; and 290 tons per day of washed starch slurry. If other conditions are maintained constant, an increase in the amount of fresh water for washing the starch results in an increase in the amount of waste water.

Figure 6:
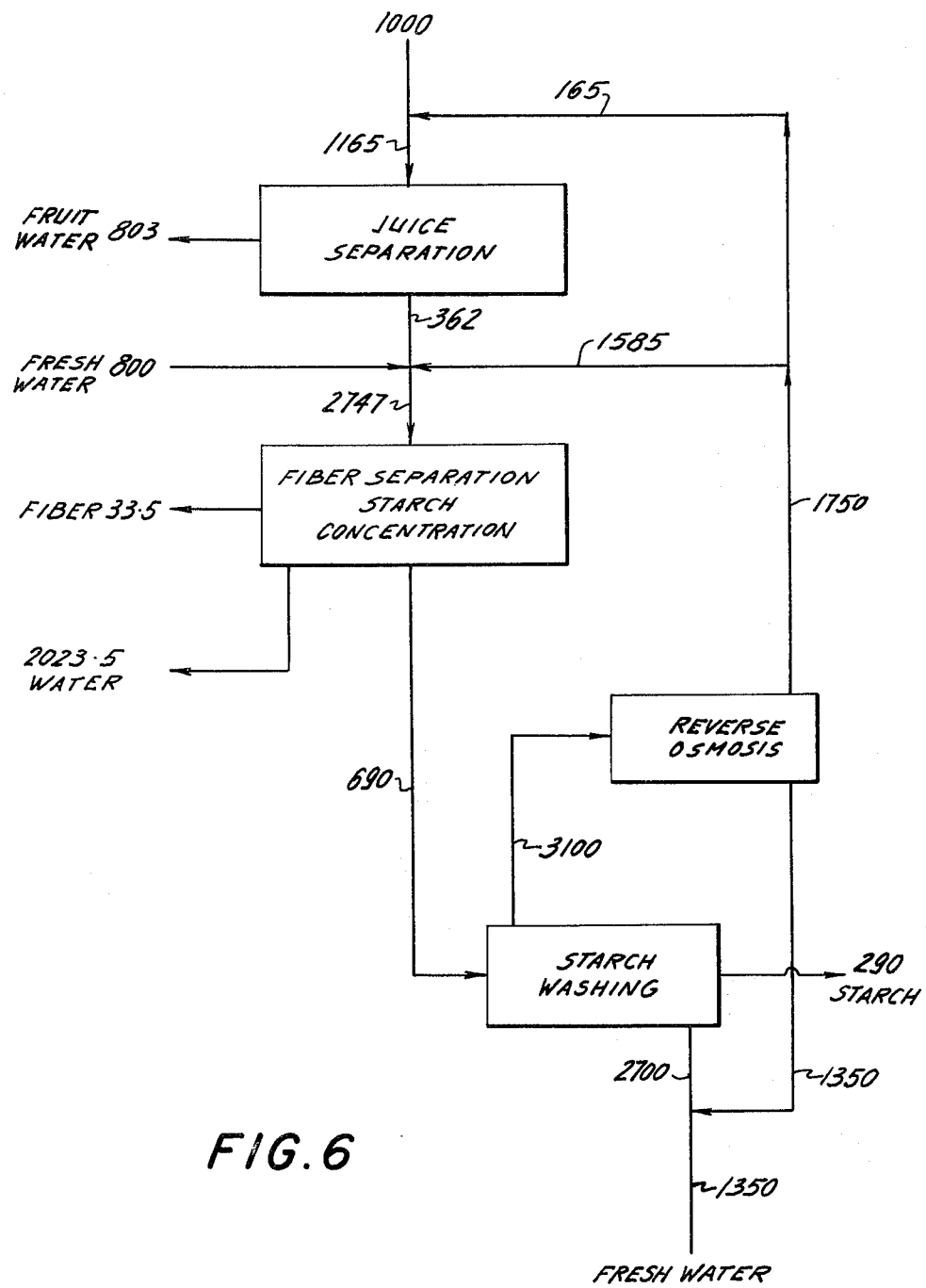

Referring now to FIG. 6, the process of this invention is distinguished from the conventional process in that water leaving the first stage of the starch washing step is separated by reverse osmosis into two fractions of which the first is recycled to the starch washing step, and the second passes to the juice separation and fiber separation/starch concentration steps.

By this means, although the total amount of washing water used remains the same at 2700 tons per day, the amount of fresh water supplied is halved, in comparison with the conventional process, to 1350 tons per day. In the same way, the amount of waste water removed is reduced from 3373.5 to 2023.5 tons per day.

Figure 7:
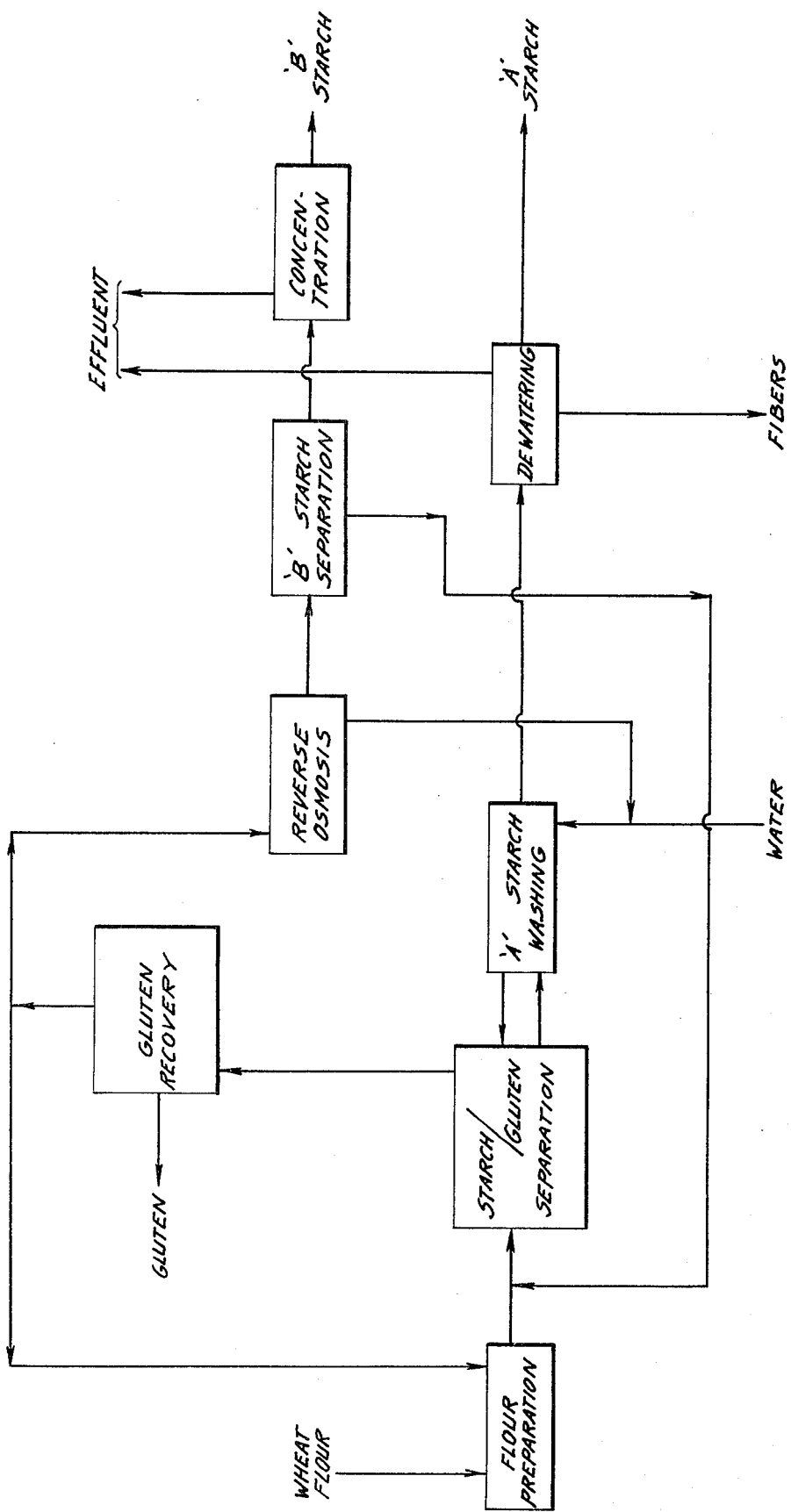
FIG. 7 is a diagram of the process as applied to wheat.

Referring now to FIG. 7, the operations involved in a process according to this invention for recovering starch from wheat flour are shown as separate boxes. Wheat flour is slurried and separated into a starch rich stream ('A' starch) and a gluten-rich stream which passes to a gluten recovery station. The effluent from this station is divided into two streams, of which one is subjected to reverse osmosis and split into a first fraction (permeate) of low solubles and insolubles content, and a second fraction ('B' starch). The permeate is recycled and mixed with fresh water entering the system at the last stage of washing the 'A' starch.

This arrangement reduces fresh water requirements by an amount equal to the permeate from the reverse osmosis station, and correspondingly reduces the volume of effluent to be evaporated or otherwise treated. The size of the concentration equipment can also be reduced. The quality of the starch can be controlled by adjusting the quantity of permeate produced and recycled. As wheat contains high concentrations of enzymes and salts, the washing of starch from wheat requires careful control.

The following experiments were performed to determine suitable conditions for reverse osmosis. In each case 50 l. aliquots of supply were separated into 25 l. of permeate (first fraction) and 25 l. of concentrate (second fraction). The membranes employed were all supplied by Wafilin N. V., Hardenberg, The Netherlands.

EXAMPLE I

The membrane used had a retention on NaCl of 95% and a clean water flux of 44 liters per square meter per hour at 40 atm. pressure and 14° C. The supply was middlings water i.e., the effluent from the middlings concentrator supplied from step (iii) of a wet-milling process. The supply at 17° C. and 40 atm. pressure, was circulated in the system at a velocity of 2 meters per second. The results, including a comparison with city water, are set forth in Table I.

TABLE I

|  | Supply | Concentrate | Permeate | City Water |
|---|---|---|---|---|
| Nitrogen, ppm | 860[1] | 1710 | 6 | 0.5 |
| Hardness, °F. | 26 | — | 1.25 | 25.8 |
| Cl—, ppm | 35 | 67 | <3 | 39 |
| Transmission % (600 × .10-9M 4 cm) | — | — | 97.1 | 96.7 |
| pH | 3.7 | 3.8 | 2.7 | 7.5 |
| dry substance, grams/liter | 13.9 | 27.8 | 0.22 | 0.3–0.4 |
| solubles, grams/liter | 13.4 | 22.6 | 0.22 | 0.5 |

[1]Nitrogen analysis made on filtered samples.

EXAMPLE II

Three different semi-permeable membranes were used in accordance with the process of Example I. The membrane characteristics were as follows:

|  | Retention on NaCl % | Clean Water Flux (at 10 atm and 14° C.) (liters per square meter per Hour) |
|---|---|---|
| Membrane 1 | 92.8 | 50.3 |
| Membrane 2 | 73.3 | 102.1 |
| Membrane 3 | 59.8 | 126.9 |

The supply was the middlings effluent from step (iii), supplying the middlings concentrator. The supply, at 17° C. and 42 atm. pressure, was circulated at 1.6 meters per second. The results are tabulated in Table II.

TABLE II

|  | Sup-Supply | Concentrate with with Membrane No. | | | Permeate from Membrane No. | | |
|---|---|---|---|---|---|---|---|
|  |  | 1 | 2 | 3 | 1 | 2 | 3 |
| N2, ppm | 700[1] | 1394 | 1350 | 1385 | 6 | 10 | 15 |
| Hardness, °F. | — | — | — | — | 1.0 | 3.0 | 1.0 |
| Cl—, ppm | 35 | 67 | 61 | 56 | ~3 | ~9 | ~14 |
| Transmission | — | — | — | — | 96.8 | 95.1 | 95.9 |
| pH | 3.7 | 3.7 | 3.7 | 3.7 | 3.1 | 3.1 | 3.1 |
| dry substance, grams/liters | 44.3 | — | — | — | 0.10 | 0.14 | 0.19 |

[1]Nitrogen analysis made on filtered samples.

Having set forth the general nature and some specific embodiments of the present invention, the scope of the invention is now particularly pointed out in the appended claims.

What is claimed is:

1. A process for recovering a starch slurry from a starch bearing material by the sequential steps of:
   (i) forming an aqueous slurry of a comminuted starch bearing material,
   (ii) separating a starch rich fraction from said slurry, and
   (iii) washing said starch rich fraction in at least one stage to purify it,
wherein the improvement comprises introducing fresh water at step (iii) and using water that has been used in step (iii) for step (i) and step (ii), wherein at least part of the water that is used in the process but has not yet exited therefrom is separated by reverse osmosis or ultrafiltration into first and second fractions of which the first fraction has lower contents of both soluble matter and insoluble matter than the second fraction, said first fraction being recycled and combined with the fresh water to increase the purity of the starch in step (iii).

2. The process of claim 1, wherein the starch bearing material is corn, and said corn is comminuted by first steeping and then wet milling.

3. The process of claim 2, wherein all of the water leaving the washing step (iii) is separated into said first and second fractions and said second fraction passes to step (ii).

4. The process of claim 2, wherein water carrying gluten in suspension which has left a station of primary separation of gluten from starch is separated into said first and second fractions and said second fraction passes to the wet milling step.

5. The process of claim 1, wherein the starch bearing material is potatoes.

6. The process of claim 5, wherein water from a first stage of starch washing is separated into said first and second fractions and said second fraction passes to step (ii).

7. The process of claim 1, wherein the starch bearing material is selected from the group consisting of wheat and wheat flour.

8. The process of claim 1, wherein separation by reverse osmosis is performed by maintaining a continuous cyclic flow of liquid through a tube of a semi-permeable membrane material, adding the solution to be separated into fractions to said liquid, recovering said first fraction through the semi-permeable membrane, and recovering said second fraction by bleeding it off from said liquid.

9. The process of claim 1, wherein said first fraction is recycled by introducing it into an intermediate stage of a multi-stage starch washing station.

10. The process of claim 1, 2 or 5 wherein the first fraction is recycled by introducing it together with fresh water, into the last stage of a multi-stage starch washing station.

11. The process of claim 3 or 4 wherein said second fraction passes through a gluten concentration stage prior to passing through an upstream processing step.

12. A process for recovering a starch slurry from a comminuted starch bearing material by the sequential steps of
 (i) forming an aqueous slurry of said material,
 (ii) separating a starch rich fraction from said slurry, and
 (iii) washing said starch rich fraction to purify it, wherein the improvement comprises
  (a) introducing fresh water in step (iii),
  (b) separating water exiting from step (iii) into two streams, one stream being supplied to step (ii) and the other stream being separated by reverse osmosis or ultrafiltration into first and second fractions, the first fraction having a lower content of soluble and insoluble matter than the second fraction,
  (c) combining said first fraction with said fresh water and combining said second fraction with said one stream, and
  (d) supplying water used in step (ii) to step (i).

13. The process of claim 12 wherein said starch bearing materials are selected from the group consisting of corn, wheat, potatoes and starch bearing fractions thereof.

14. The process of claim 12 wherein step (iii) is carried out in two or more stages and said first fraction is supplied to the final stage.

* * * * *